United States Patent [19]

Wolfersberger et al.

[11] Patent Number: 4,815,956
[45] Date of Patent: Mar. 28, 1989

[54] INSOLE FEEDING APPARATUS FOR A MOLDING PRESS

[75] Inventors: Charles Wolfersberger; Joseph R. Hanson, Jr., both of St. Louis, Mo.

[73] Assignee: Brown Group, Inc., St. Louis, Mo.

[21] Appl. No.: 879,412

[22] Filed: Jun. 27, 1986

[51] Int. Cl.$^4$ .............................................. B29C 45/76
[52] U.S. Cl. .................................. 425/126.1; 425/137; 425/154; 425/397
[58] Field of Search ............... 425/110, 116, 117, 119, 425/126 R, 135, 137, 129 S, 127, 126.1, 154, 397; 414/222, 225, 230; 901/6

[56] References Cited

U.S. PATENT DOCUMENTS

| | | | |
|---|---|---|---|
| 3,525,382 | 8/1970 | Devol | 425/137 |
| 3,937,057 | 2/1976 | Trolle | 901/6 |
| 4,093,413 | 6/1978 | Schöllhorn et al. | 425/126 |
| 4,197,772 | 4/1980 | Anderson et al. | 901/6 |
| 4,498,854 | 2/1985 | Ross | 425/126 |
| 4,563,148 | 1/1986 | Hasl et al. | 425/126 R |
| 4,571,320 | 2/1986 | Walker | 425/137 |
| 4,599,026 | 7/1986 | Feiber et al. | 414/330 |
| 4,636,126 | 1/1987 | Spotts | 414/225 |

FOREIGN PATENT DOCUMENTS

| | | | |
|---|---|---|---|
| 0127234 | 7/1984 | Japan | 414/225 |
| 1416429 | 12/1975 | United Kingdom | 425/126 |

OTHER PUBLICATIONS

Ernst Mohrbach-Shoesole Formpress, Nr. 40.
Ernst Mohrbach-Seim-Automatic Press, Nr. 41.
Ernst Mohrbach-Automatic Press, Nr. 41Z.

*Primary Examiner*—Willard E. Hoag
*Attorney, Agent, or Firm*—Gravely, Lieder & Woodruff

[57] ABSTRACT

Insole feeding apparatus for a molding press having an insole receiving cavity to receive insoles from a support structure that carries dual trays which hold insole supplies alternately positionable to allow insoles to be picked out of a tray and placed in the mold cavity. The mold press is provided with an insole kicker plate subject to positional adjustment in the cavity in accordance with an operator teach device capable of locating the kicker plate in the mold cavity for producing molded insoles having desired style and size characteristics. The apparatus is made to follow a desired method in which kicker plate adjustments can be stored in a computer memory for rendering the molding press capable of accommodating various insole and size production runs.

12 Claims, 5 Drawing Sheets

INSOLE FEEDING APPARATUS FOR A MOLDING PRESS

BACKGROUND OF THE INVENTION

1. Field of the Invention

This invention is directed to apparatus for feeding insoles into a molding press and to a method for automatically feeding insoles to a molding press.

2. Description of the Prior Art

It is known that molding presses for insoles have existed for many years and that many presses has relied upon an operator manually feeding insoles into a molding press. One such molding press in made by Ernst Mohrbach K.G. Maschinenfabrik of West Germany. This type of insole molding machine has been supplied to the shoe manufacturing industry in several embodiments. An early machine required the insoles to be fed manually, a pair at a time, and supplied with an electronic eye to control the molding operation, subject to removal of the operator's hand from the molding area. A more advanced embodiment of a Mohrbach molding machine was equipped to be supplied with or without automatic feeding devices. The automatic feed embodiment incorporated such picking of pairs of insoles from a pile magazine which were then put into the molds. The pile magazines were arranged for left and right insoles, the magazines could be filled up while the machine is operating so that several machines could be operated by one operator simultaneously. When no insoles could be sucked up the machine stopped. An automatic machine had to be fed with a swinging feeder to place the insoles in pairs which would then be molded and ejected. Provision was made to set the machine to the respective insole or shank size by means of an adjusting wheel and scale.

It is further known that a Puma robot has been programmed to simulate automatic feeding of insoles to molding machines of the Mohrbach type. However, in employing the robot for feeding insoles it introduced a problem of not matching the molding machine cycle time, and being significantly slower than manual feeding. Numerous other problems have been encouraged so that a robot type loader of substantially trouble free character had an unacceptable cost factor when compared to having a loading mechanism for placing insole parts in a molding machine under a control system which is able to initiate and monitor all working components.

BRIEF DESCRIPTION OF THE INVENTION

A presently preferred embodiment of an insole feeding apparatus incorporates main components of insole holding trays in duplicate so that while one tray is in an insole feeding position the duplicate is in a reloading position, an insole picking mechanism for sequentially picking a pair of insoles and inserting them into the molding cavity where they are released and the picking mechanism retracted, and an insole kicker device incorporated in the mold press and operable to position the insoles within the mold cavity in the correct position to obtain acceptable molded insoles.

The objects of the present invention are to provide insole feeding apparatus adapted to perform as an automatic insole feeder for a Mohrbach press, to provide a machine loading system having a two-axis loader with suction pickers, and to provide insole holding trays in duplicate with shuttle means to alternatively position the trays for feeding the Mohrbach press.

A further object of the present invention is to provide an insole feeder for a molder press that will require a minimum of movable components having uncomplicated motions adapted to be subject to the scheduling in a programmable controller of a sequence of motions and/or functions particularly adapted to automatically feed an insole molder.

A further object of the present invention is to provide insole feeding apparatus adaptable to a method of operation which incorporates shared steps of molding insoles with steps accommodating support operations for maintaining productivity of molded insole production.

Other objects and advantages will be described in the following detailed description of the presently preferred embodiment of an insole feeding apparatus, together with its method of operation.

BRIEF DESCRIPTION OF THE DRAWINGS

Referring to the accompanying drawings.

DESCRIPTION OF A PREFERRED EMBODIMENT

Figure 1:
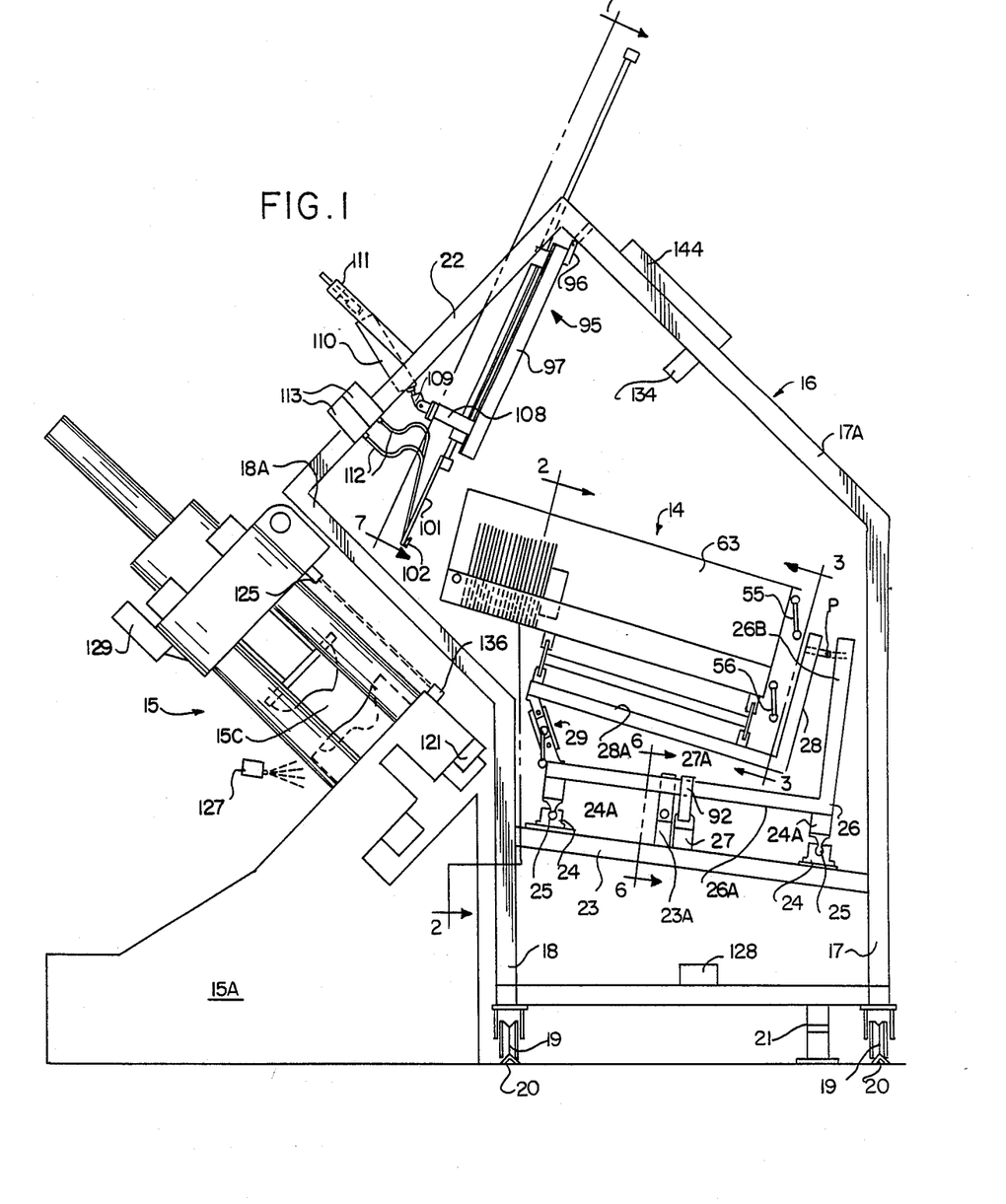
FIG. 1 is a side elevational view of the insole feeding apparatus which functions as the insole feeder attachment to a Mohrbach press.

The insole feeding apparatus 14, associated with a Mohrbach press 15, is carried in a support assembly which is a main frame 16 formed with vertical front legs 17 and short rear vertical legs 18, the bottom ends of which front and rear legs are provided with wheels 19 engaged on inverted V tracks 20. The frame 16 is moved along the tracks 20 by a fluid pressure cylinder 21. The purpose of the tracks 20 is to allow the entire support assembly to be moved so access to the Mohrbach press 15 can be made easy for mold changes and necessary servicing. The vertical front legs 17 have the upper length 17A angularly directed off-vertical, and the vertical and shorter rear legs 18 have the upper lengths 18A angularly directed off-vertical and substantially parallel to the leg lengths 17A. The leg lengths 17A and 18A are joined by tie bar means 22. These legs of the frame and the tie bars may be constructed of suitable angle irons or box section tubes, or solid bars to provide the necessary strength to support the operating components of the feeding apparatus 14.

Within the main frame 16, there is a fixed frame structure supported by and between the vertical legs 17 and 18. Angularly inclined members 23 of the frame support bearing blocks 24 for linear bearings 25 which, in turn, are connected by blocks 24A to a subframe structure 26 which moves transversely relative to the inclined members 23, that is to say in a direction perpendicular to the plane of the drawing sheet through the activation of drive means 88. The subframe 26 made up of a number of tubular members is substantially L-shaped such that its inclining member 26A is substantially parallel to the inclined members 23 and its erect member 26B is upwardly directed at about 90°.

A similarly shaped L-shaped inner tray supporting frame 28 has one member 28A pivotally connected at its upper end to subframe member 26B at a pivot joint P. The reclining member 28A of the frame 28 is connected to the underlying reclining member 26A of the subframe 26 by adjusting mechanism 29 seen in FIG. 2 attached by blocks 30 to the reclining member 26A of the subframe 26. A system of scissor links 31 carried on the member 26A are attached to the underside of the reclining member 28A. The scissor links 31 are provided to interconnect adjacent ends of scissor links 31 and opposite adjacent ends of the scissor links 31 are horizontally separated and attached to horizontally spaced threaded blocks, all as is well understood in the art. The respective blocks are threaded onto adjusting threaded shafts 34 in the following arrangement. Still referring to FIG. 2, there is a left hand thread shaft 34 with a manual crank 34A. The shaft 34 engages in the left hand block for the links 31. That left hand thread shaft 34 is connected to an axially aligned right hand thread shaft 35 which engages in the right hand block for the links 31. The shaft 35 is supported at its inner end in a coupling 36 which also supports an idler shaft 37 that carries a second coupling 38 for a shaft 39 associated with an axially aligned shaft 40. The shaft 39 is formed with a left hand thread which engages a block associated with links 31, and the shaft 40 has a right hand thread which engages a block associated with links 31, and a shaft 40 is provided with a crank 40A.

Figures 2, 3A:
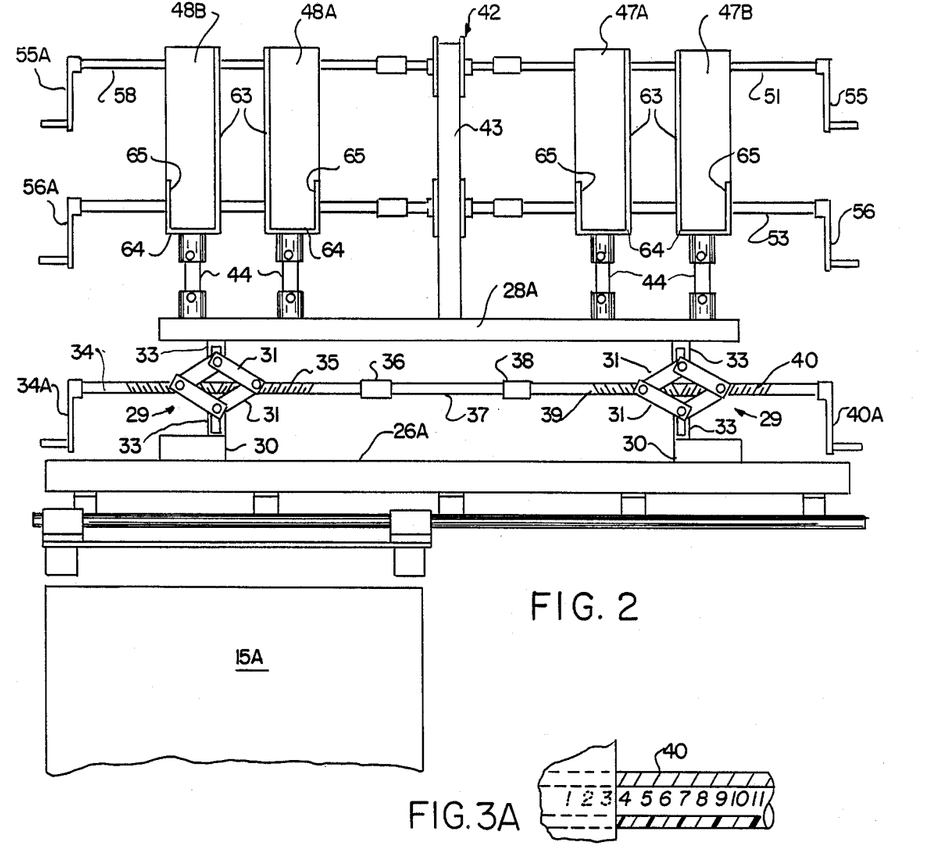
FIG. 2 is a transverse view taken along line 2—2 in FIG. 1 showing insole feeder trays in duplicate pairs and adjustment means associated therewith.
FIG. 3A is a fragmentary detail of means for indicating to an operator how to set the mechanism in positions corresponding to insole sizes.

The foregoing adjusting mechanism seen at 29 in FIG. 1 operates the scissor links 31 by either of the hand cranks 34A or 40A to elevate or lower the left hand end of the subframe 28, as viewed in FIG. 1, which is provided to adjust the depth of the insoles inside the mold cavity 15C of the Mohrbach press 15, as will be explained presently. An important feature is that when hand crank 34A is turned the shafts 35 and 35 will rotate together through the couplings 36,38 and idler shaft 37 to turn shafts 39 and 40 to open or close both sets of the scissor links 31 for the purpose of changing the angular position of the beforementioned inner frame member 28, as seen in FIG. 1. Similarly, when hand crank 40A is turned, instead of crank 34A, it will serve to expand or close the scissor links 31 to adjust the position of the number 28B.

A feature of the assembly of FIG. 2 is seen in FIG. 3A in the provision of index marks on the shaft 40 adjacent the hand crank 40A. The index marks or numbers denote machine settings, such as numbers 4, 5, 6, 7 and so on. The numbers are located on shaft 40 so the translational motion of the block nearest to the right hand crank 40A will align with a selected number. The opposite crank 34A is provided so adjustments from either side of the main frame 16 may be made. It can be appreciated that rotation of shafts 34, 35, 37, 39 and 40 will move the inner frame 28 about its pivot P to raise or lower the insole feeder structure. The movement of the insole structure enables insole depth settings to be selected for styles of insoles.

Figure 3:
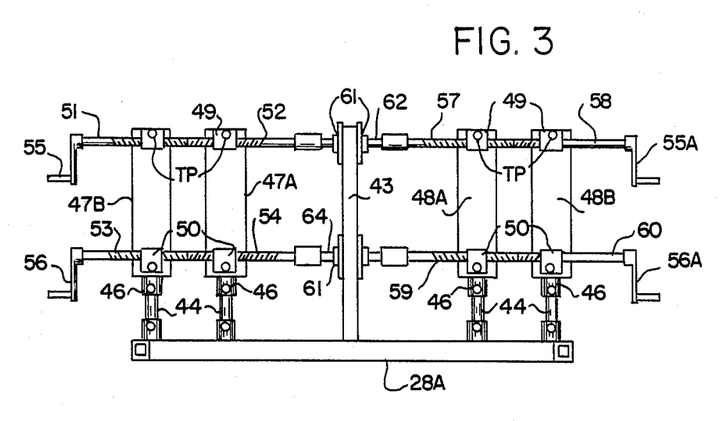
FIG. 3 is a fragmentary detail view of means to visually display insole toe and heel alignment adjustments as seen along line 3—3 in FIG. 1.

It can be seen, in the light of FIG. 1, that the view of FIG. 3 is transverse to the elongation of the insole feeder tray structure 42 which is assembled on the member 28A in the following manner. Member 28A carries a central column 43, and a pair of pivot links 44 at the left and a similar right hand pair of pivot links 44, each link being pivotally attached to a clevis element 46, and each clevis element 48 is connected to the bottom end of an insole support tray, there being a left hand pair of trays 47A and 47B and right hand trays 48A and 48B. It can be recognized from the drawings that there is a pair of double trays to accommodate the need to carry right and left shaped insoles. The upper and lower ends of the respective trays 47A, 47B, 48A and 48B are provided with internally threaded blocks 49 and 50 respectively. A left hand threaded shaft 51 and a right hand threaded shaft 52 are engaged with each other and are threaded in the blocks 49 for trays 47A and 47B, and a similar left hand threaded shaft 53 and a right hand threaded shaft 54 are engaged with each other and are threaded in the blocks 50 at the bottom of trays 47A and 47B. The shafts 51 and 52 rotate together when operated by crank 55 and shafts 53 and 54 are joined so they rotate together when the crank 56 is turned. However, the upper shafts are independent of the lower shafts, as will appear. The right hand pair of insole trays 48A and 48B are provided with left hand thread and right hand thread shafts 57 and 58 respectively. These shafts 57 and 58 are engaged with each other and are threadedly engaged in blocks 49. Other left hand thread and right hand thread shafts 59 and 60, respectively, are connected and are engaged in tray blocks 50. The shafts 57 and 58 are joined to rotate together. Similarly, shafts 59 and 60 are joined to rotate together. The central column 43 carries shaft collars 61 to support a shaft 62 having couplings 63 on its opposite ends to join shafts 52 and 57 for rotation together. A similar shaft 64 in collar 61 has end couplings 65 which joint shafts 54 and 59 which can rotate together. Other hand cranks 55A and 56A are mounted on the shafts 58 and 60 respectively.

Thus, either upper crank 55 or 55A can be used to adjust the upper ends of trays 47A, 47B, 48A and 48B for either spreading the toes of insoles in the trays or drawing the toes together, all for insole toe adjustment. Independent insole heel adjustment can be obtained in a similar manner by either crank 56 or 56A. Such in or out movement of the upper and lower ends of the respective trays can be obtained by the provision of tray pivot elements TP, together with the necessary reaction of the pivot links 44. The foregoing toe and heel adjustments are necessary for proper positioning of the insoles in the mold cavity 15C to avoid making insoles that must be rejected. It is noted that adjustments of the toe and heel trays can be indicated by indicia numbers (or marks) on the shafts 58 and 60 as indicated. This features is shown in a fragmentary and enlarged view in FIG. 3A adjacent the toe threaded block 49 for the tray 48B. This same detail is intended to be employed in connection with the indicia referred to in the view of FIG. 3.

Figure 4:
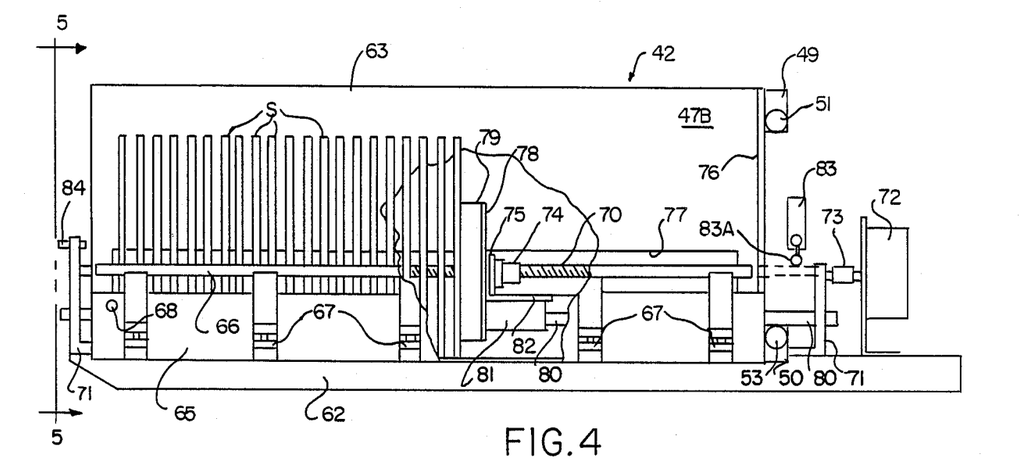
FIG. 4 is a side elevational view of the insole feeding tray assembly along with components permitting its effective operating in the apparatus seen in FIG. 1.
Figure 5:
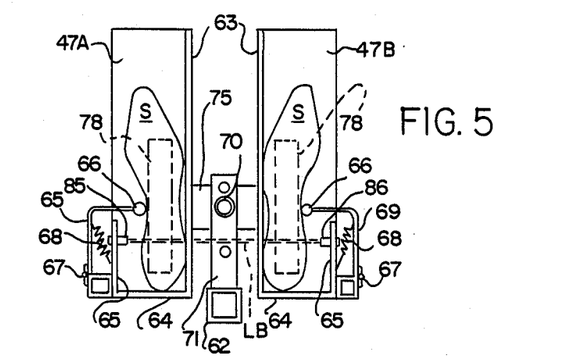
FIG. 5 is a transverse view of the tray assembly seen along line 5—5 in FIG. 4.

Turning now to FIGS. 4 and 5, the outside tray 47B of insole feeding trays 47A and 47B require a support 62 on which both pairs of the insole trays 47A, 47B and 48A, 48B are assembled to constitute the insole feeder 42. That insole feeder 42 is made up of sets or right and left hand trays (see FIG. 5), each having vertical side walls 63 extending in back to back spaced relation from bottom walls 64, and open above a low outer wall 65 so that a batch of insoles S can be loaded into position with the heels ends resting on the bottom walls 64 and the toes pointed vertically up. The batch of insoles S are releasibly held in position by retainer rods 66 pivoted at hinges 67. Resilient means 68 retains the rods 66 against the instep of the insoles S. The rods 66 are carried on spaced arms 69 which are part of hinges 67. In the view of FIGS. 4 and 5 it can be seen that there is a ball screw shaft 70 positioned in the space between the tray side walls 63, and supported at its opposite ends by brackets 71. The shaft 70 is rotated by a reversible motor 72 connected at coupling 73. In FIG. 4 a part of the low wall 65 and a side wall 63 has been broken away to reveal a travelling nut 74 on shaft 70, both of which are located in that space. The nut 74 is connected to a transverse arm 75 which extends into each of the tray rear walls through the provision of elongated slots 77 in each wall 63 (see FIG. 4). The arm 75 supports a pair of metallic plates 78, each faced with a wood or other type material pusher block 79 engaged on the last or trailing one of the insoles S. Each block 79 has a metallic member or plate 78, the purpose of which will be pointed out presently. The insoles S have been shown in spaced relation only for the purpose of clarity in the drawing, but in reality the insoles are stacked in abutting relation in the trays. Since the shaft 70 rotates it is necessary to mount an elongated linear bearing 80 parallel thereto to receive a slide block 81 attached to the bracket 82 for preventing rotation of the blocks 79 and plates 78. By comparing the left hand end of FIG. 4 with FIG. 5 it can be seen that the tray 47B is opened outwardly so that its high side wall 63 is behind a batch of insoles S and its low front wall 65 can be clearly seen, together with the positioning insole retainer rods 66 bearing upon the insoles. Furthermore, the adjustment shafts 51 and 53 can be seen mounted in blocks 49 and 50 respectively. The adjusting cranks 55 and 56 for these shafts 51 and 53 have been omitted so as to avoid obscuring other details to be referred to.

It can be seen in FIGS. 4 and 5 that there are control elements associated with the insole feeder apparatus. For example, a limit switch 83 is positioned so that its actuating arm 83A projects into the path of the travelling nut 74 when the nut has been moved rearwardly to its home position near the drive motor 72. When the insoles have been fully discharged from the tray 47B, the pusher block 79 breaks the light beam LB (see FIG. 5) which is created by a beam sender 85 directed so that its beam is picked up by a receiver 86. The breaking of the light beam indicates that the tray is full of insoles S. As insoles are picked off, the outer block 79 advances with only a slight "make" of the beam between insole picks. When the last insole has been picked the light beam will be broken by the pusher block 79 and simultaneously the metallic plate 78 will trigger the proximity switch 84 to indicate that the block 79 can advance no further. The energizing of the proximity switch 84 triggers the reversing circuit to the drive motor 72 for returning the travelling nut 74 to its home position, and when the limit switch arm 83A is contacted the motor 72 is stopped.

Figure 6:
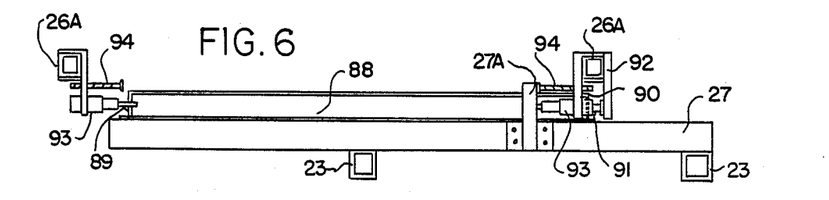
FIGS. 6 and 6A are fragmentary views of the shuttle mechanism in its two positions of shift, the view being taken along line 6—6 in FIG. 1.
Figure 6A:
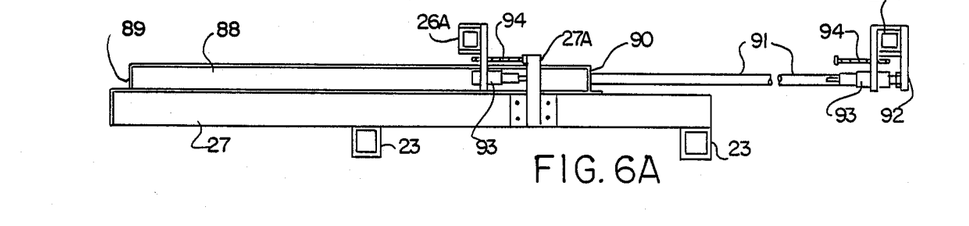

It has previously been indicated that the insole feeder assembly 42 can be shuttled laterally with respect to the Mohrbach press 15 so that the dual or double insole trays can be selectively positioned in proper alignment with an insole receiving station which is defined as the location of the vacumm cups 102 and with respect to the press, whereby, when one tray is being emptied of its batch of insoles S, the companion tray assembly can be reloaded. In this unique manner, feeder assembly 42 can be shuttled back and forth transversely of the press so as to establish a substantial continuity of insole molding operations. The shuttle mechanism is best understood from FIGS. 1, 2, 6 and 6A and is operatively connected to the frame assembly 26 seen in FIG. 1. The shuttle includes the bearing shafts 25 carried to slide in stationary blocks 24 on the frame 23 and the shafts 25 carry support blocks 24A connected to frame member 26A. Intermediate the position of the shuttle bearing shafts 25, and as seen in FIGS. 6 and 6A, there is a drive means which is mounted in a stationary position on frame members 23. The means includes the fixed support for a fluid pressure cylinder 88. The base end of the cylinder 88 is supported in a bracket 89 and the opposite end is supported in a bracket 90, both brackets being attached to the support 27. The movable rod 91 in the cylinder 88 is connected to a bracket 92 which, in turn, is connected to a part 26A of the subframe 26. It can be seen in FIG. 6A that the extension of the piston rod 91 to the right will shift the subframe structure 26 represented by members 26A longitudinally and rightwardly of the stationary member 27. That motion realigns the double insole tray structure 42 with the insole receiving station adjacent press 15. It is desirable to provide fixed abutment 27A for absorbing the stopping momentum of the subframe structure 26, and that is taken care of by a suitable shock absorber 93 at each end of the stroke of the subframe 26A. In addition, an adjustable screw 94 is provided at each end to establish a "hard stop" for the subframe movement.

Figures 7, 8, 10:
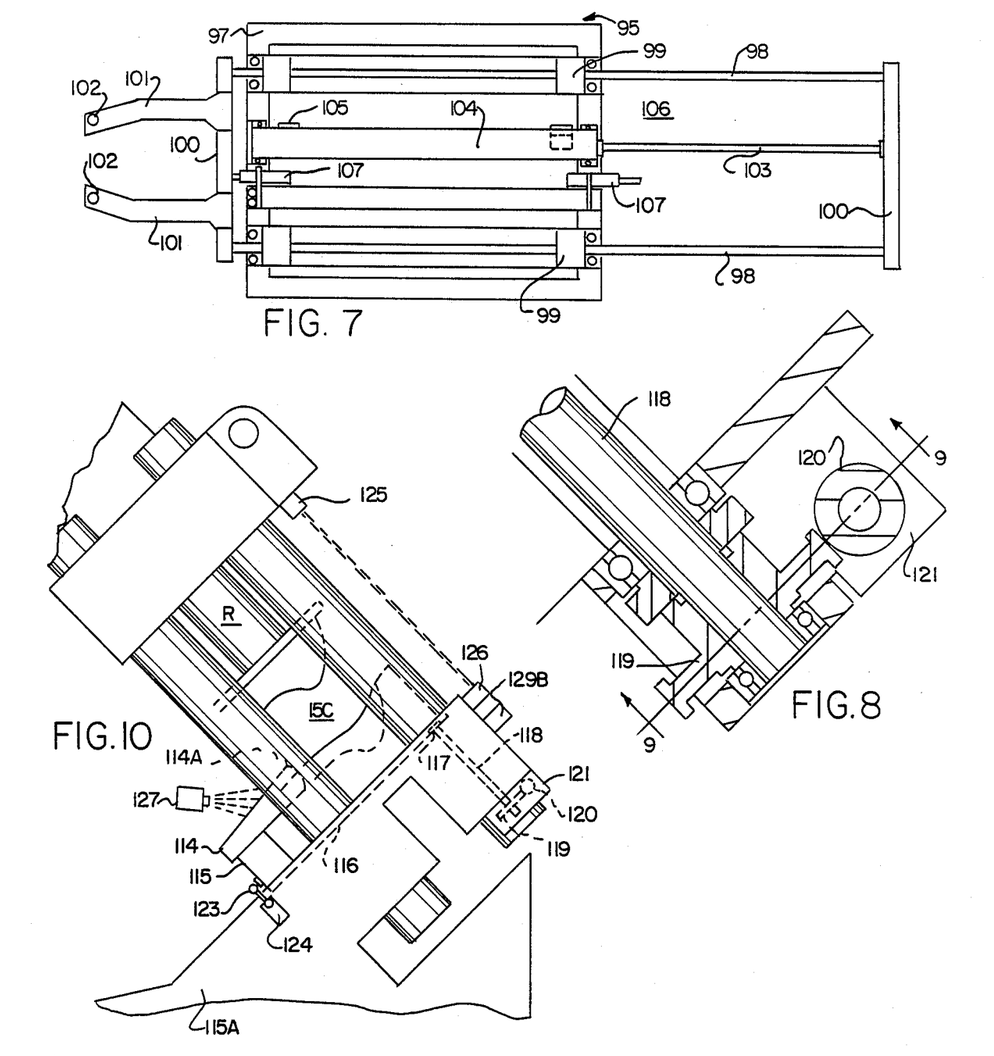
FIG. 7 is a fragmentary view of the details of the insole picker mechanism as seen along line 7—7 in FIG. 1.
FIG. 8 is fragmentary sectional view of a device for adjusting a Mohrbach press kicker plate.
FIG. 10 is a fragmentary view of the Mohrbach press to illustrate in more complete form the operating connection to the kicker plate.

Assuming that the subframe 26 has been shuttled to one of its operative positions so that one pair of insole trays is in a delivery position at the receiving station relative to the press 15, it can be seen in FIGS. 1 and 7 that there is an insole pickoff frame 95 pivotally mounted on the main frame member 17A at pivot 96. That pivot is associated with a frame assembly 97 best seen in FIG. 7. Frame 97 carries a pair of slide rods 98 mounted in brackets 99, and the slide rods are interconnected by tie members 100 so that they will move together. One of the tie members 100 carries a pair of fingers 101, and on the outer end of each of those fingers there is mounted a vacuum cup 102. The opposite member 100 is connected to a piston rod 103 which is shown in an extended position relative to its cylinder 104. The cylinder supports magnetic reed switches 105 and 106 of known character in proper position to generate a signal when the magnetic piston attached to piston rod 103 is either in its extended position or in its retracted position. Furthermore, the slide rods 98 and the end members 100 form a movable part of the assembly and at the end of its stroke the end members are adapted to engage shock absorbers 107 in order to cushion the end movement of that part of the assembly.

Looking at FIG. 1 in particular, the assembly 95 is provided with an arm 108 for projection from the frame 97 and is adapted to be pivotally connected to the end fitting 109 on the rod of a fluid pressure cylinder 110. The opposite end of the cylinder 110 is pivotally connected to a support structure 111 mounted on the frame member 22. The fluid pressure cylinder 110 is adapted to be controlled for the purpose of pivoting the frame assembly 95 in a direction to have the suction cups 102 move in to the receiving station where the vacuum cups 102 can contact an insole and then to retract the frame 95 with the insole suspended under suction. In order to control the suction effect at the cups 102, each cup is provided with a flexible hose 112 and each hose is adapted to be connected to its vacuum sensor device 113. The flexible hoses have to be of a sufficient length to permit the fingers 101 to be moved into the cavity space 15C in the mold press where under a suitable control response the vacuum is removed and the insoles are released to assume proper positions between the male and female portions of the mold. In robotics the finger 101 with the suction cup 102 are well understood to be end effector means.

Figure 9:
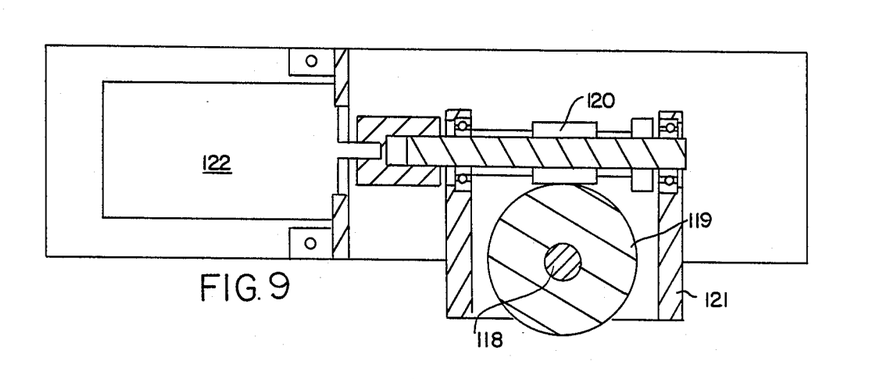
FIG. 9 is a sectional view of the stepping motor device for operating the kicker plate adjusting device, the view being taken along line 9—9 in FIG. 8.

The positioning of the insoles in the cavity 15C of the molding press is controlled by the mechanism disclosed in FIGS. 8, 9 and 10. That mechanism is in the form of a kicker plate 114 movable to act as a stop for insoles S being loaded into the press and to lift the insoles out of the cavity 15C after being molded. The kicker plate 114 is carried on a support 115 attached to a rack bar 116 slidable in the press frame 15A. The rack bar is engaged by a drive gear 117 on the end of its drive shaft 118. That shaft 118 is driven by a worm gear wheel 119 engaged by a worm gear 120, all of which components are mounted in a suitable housing 121 which carries a stepping motor 122. The rotation of the shaft 118 driven by the motor 122 effects movement of the kicker plate 114, and the fully withdrawn position of the kicker plate relative to the mold cavity is signalled when the support 115 engages the arm 123 of a switch 124. The adjustable and movable kicker plate 114 is employed to position the insole within the mold cavity 15C so the finished molded insole will be of correct dimension. The stepping motor 122 and the mechanism responsive to the motor are controlled by a computer that is able to record and recall settigns for the kicker plate 114.

The function of the kicker plate 114 is rendered controllable through the stepping motor and the associated gear drive in reponse to the programmed insole feeder computer. For example, the kicker plate 114 can be programmed according to the insole size and type depicted on the CRT terminal 139 so its end 114A will assume a position in the cavity 15C to allow the insole S to enter to a proper depth. When the slide rods 98 (FIG. 7) stop due to the insole S engaging the end 114A of the kicker plate, the vacuum will be terminated at a suitable vacuum volume located in housing 128. The insole S will be released in the cavity 15C and the slide rods 98 and fingers 101 will be withdrawn so the photoplane beam between means 125 and 126 can be reestablished to energize the control for the press to advance the ram R and close the mold cavity 15C for the required time before it reopens the cavity and allows the kicker plate 114 to discharge the insole. As the insole clears the cavity and falls into a discharge chute it will be sensed by the photocell 127 to signal that the cavity 15C is empty and ready for the next insole. The foregoing description has referred to a single insole being processed in the Mohrbach press to simplify the understanding. However, it follows that all of the control functions will apply equally to the processing of a pair of insoles at the same time.

The press 15 is provided with a photo plane control in which a light beam transceiver 125 and a reflector 126 establish a beam at the inlet side of the press to respond to the passage of an insole into the cavity 15C. On reestablishment of the beam the press is rendered operable to close the mold cavity and shape the insole as desired. It is, of course, understood that the mold dies have a slot to receive the kicker plate 114, both for locating the incoming insole and for kicking the molded insole out upon completion of the molding step. While the Mohrbach press 15, per se, is not a part of the invention, it has been modified to the extent that the kicker plate adjustment by a steppig motor has been added. In addition, the press is provided with a combined sensor beam sender and receiver 127 to direct a beam across the insole discharge chute (not shown) for generating a signal signifying the discharge of a molded insole dislodged by the kicker plate 114. This provision detects if an insole part has been kicked out of the mold cavity at the end of each cycle. Normally, with a dual insole feeder for right and left insoles, two insoles should exit through a chute (not shown) at each cycle. There are a pair of chutes as the press is designed to handle both right and left insoles. The absence of both insoles is an indication that they, or one of the insoles, are stuck in the mold cavity, and the molding machine stops. There is an exception in the case of only one insole being fed into the cavity, and this exception is detected by the vacuum sensors 113 (FIG. 1) detecting only one insole being picked from the feeder tray. In this case, the computer will respond and expect only one insole to be ejected. A more complete disclosure on the computer control provision will appear presently.

Figure 11:
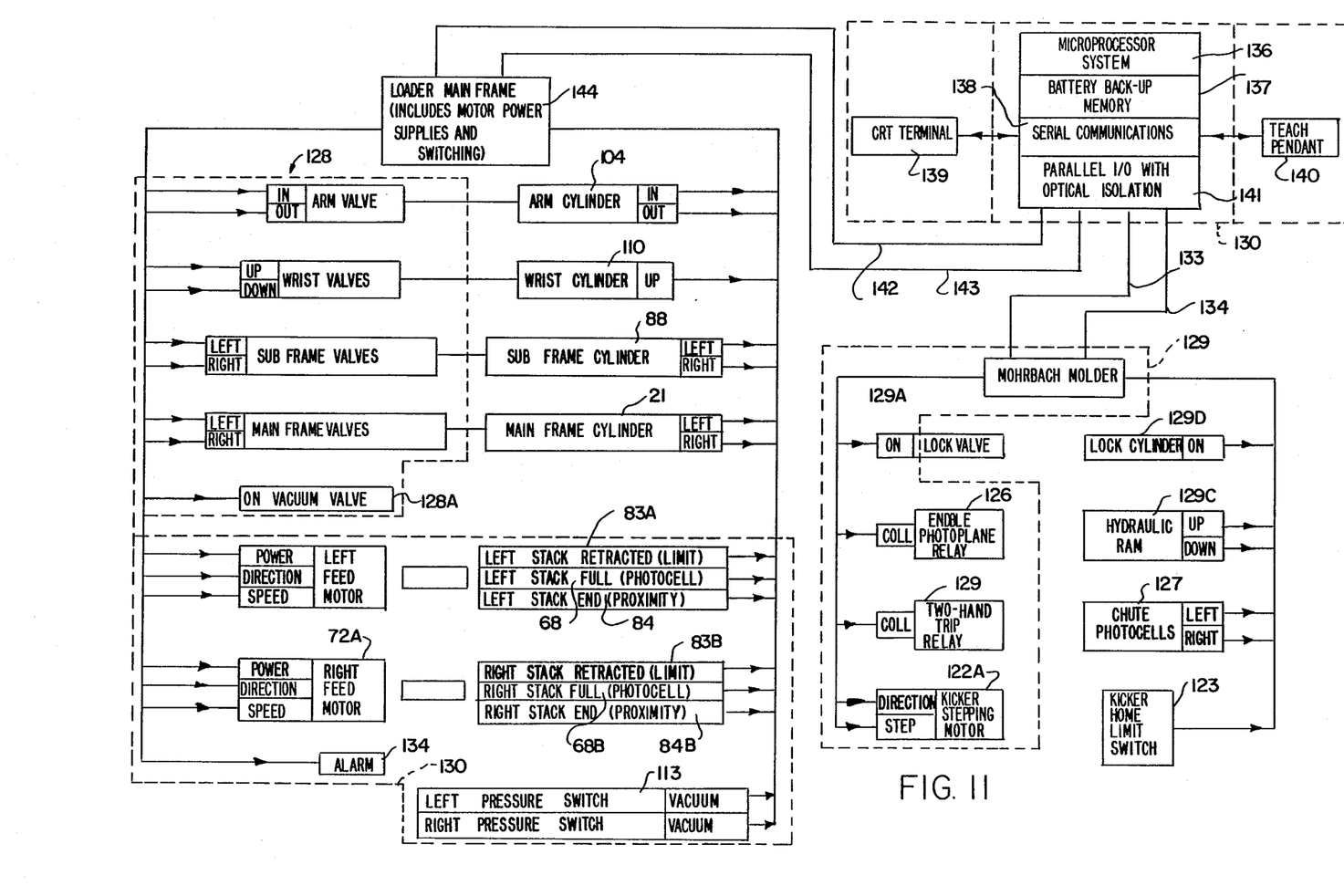
FIG. 11 is a block diagram of the electrical hardware layout showing the system by which the insole loader apparatus, and Mohrbach press is conveniently responsive to the programmable controller, together with a CRT terminal and a teach pendant.

Reference is now directed to the block diagram disclosed in FIG. 11, and the components identified in that block diagram will be referred to in the arrangement of controls seen in FIGS. 1, 4, 5 and 10. It is recognized of course, that the block diagram of FIG. 11 has been selected so as to simplify the drawing disclosure. The diagram will also be understood to have suitable electrical and hose connections to the various locations where a control device is indicated.

It is to be understood that the valves for the various control elements and vacuum pump are all to be assembled in a common housing 128 carried on a lower frame member shown in FIG. 1. The Mohrbach press 15 is provided with a suitable control housing 129 (FIG. 11) which incorporates a certain number of control elements which are denominated lock valve 129A, a two hand trip relay 129B, a direction step control 122A for the kicker stepping motor 122, and a photo plane enable relay 126. A pair of chute photocells indicated at 127 and a kicker home limit switch 123 which is located as shown in FIG. 10, and hydraulic ram limit switches 129C are disposed on the frame 15A of the press. A responsive photo plane system is mounted on the front side of the press frame 15A in the form of the elements 125 and 126, so as to be interrupted upon the motion of the fingers 101 which have positioned the vacuum cups 102 to pick off a pair of insoles (or a single insole if that condition is desired) and insert the insoles into the mold cavity 15C. It is understood that the lock valve 129A is associated with a lock cylinder indicated at 129D (FIG. 11). All of the various control elements in the housing 129 are collectively connected by suitable leads 133 and 134 into the principal control panel 130 which is a stand alone cabinet placed near the molder 15.

While the view of FIG. 4 has disclosed a single reversible motor 72 for locating the threaded shaft 70 to advance or retract the insole pusher block 79, there are in reality a pair of such motors since the view of FIGS. 2 and 3 indicate that there are dual insole supporting trays on opposite sides of a central member 43 which supports the toe and heel adjusting shafts. It is understood that the supporting trays 47A, 47B, 48A and 48B are not movable longitudinally, but each has its own pusher block 79 to advance the insoles toward the pick-off end adjacent the location of the vacuum cups 102. Accordingly, in FIG. 11 the left feed motor is indicated at 72 and the right feed motor which is not seen in FIG. 4, is indicated to be at 72A. Furthermore, the control elements shown in FIG. 4 for the retract limit switch element 83A, the tray or stack full photocell 68 and the end proximity switch 84 are all duplicated for the right feed motor 72A and are indicated in FIG. 11 at 83B, 68B and 84B. The control panel 130 includes the primary control components made up of a microprocessor 136 with its battery backup memory 137, its serial communication center 138 which is associated with a CRT terminal 139 and with a teach pendant 140, and with circuit boards 141 which embody parallel I/O with optical isolation so as to be connected in circuit with leads 133 and 134 from the Mohrbach press control box 129 and in circuit with leads 142 and 143 from a junction box 144 associated with the operating cylinders, valves and motors disclosed in the foregoing structure.

A unique feature of the present invention resides in the way the kicker plate 114 is controlled through a stepping motor 122 (FIGS. 9, 10 and 11). The normal Mohrbach press has a kicker plate that is manually positioned, but moved by pressure fluid means to kick out a molded insole on the opening of the molding dies. This is an inefficient way to operate and slows the output production from the press. According to the present invention the kicker plate adjustment has two different modes of operating. The two modes are "teach" for insoles that have not been run before, and "run" for insoles that have been run before.

In the "teach" mode, the teach pendant 142 (FIG. 11) is employed in the following manner: When an operator wants to run an insole that has not been run before, the computer in the microprocessor system 136 will require the teach pendant to be used. When entering the teach mode, the computer will ask for insole style number, insole size, insole width, and mold number. The operator will enter this information by using the keyboard on the CRT 139 to feed in that information. Next, the operator will adjust the kicker plate position by pushing on "move" buttons on the teach pendant which will energize the stepping motor 122 a step at a time in the proper direction. In this way, the operator can locate a starting position for a trial and error run to teach the adjustment to the computer. The CRT 139 will then be used to direct the insole feeder 95 to load one pair of insoles at a time which will be molded by the press 15. Each pair will be visually checked for dimension and shape characteristic. It may be necessary to readjust the kicker plate by again using the teach pendant push buttons.

When a satisfactory setting has been "taught", the operator presses the "record" button on the teach pendant which stores the kicker plate setting in the computer memory.

The "run" mode is used during normal operation of feeding insoles to the press 15. On entering the "run" mode, the computer will again ask for style, size and mold information which the operator types in at the CRT 139. Using this typed in information, the computer checks its memory looking for kicker plate settings that may have been entered earlier. If the setting is found the computer directs the kicker stepping motor 122 to move the kicker plate 114 to the position it was taught. This eliminates trial and error adjustment procedure that would have been required. The apparatus is now set-up and may begin loading insoles into the press 15.

If an insole setting is not found in the memory, the computer will search its memory for other sizes of the same insole style taught with the same mold number. If two or more taught sizes are found; the computer will use a straight line averaging technique to calculate the setting of the requested size, and then will move the kicker plate 114 to that setting. Again, the apparatus will be set-up and may being loading insoles into the press. However, an unsuccessful search for related insole sizes will cause a message to be displayed on the CRT screen requesting that the operator go to the "teach" mode using the pendant 140. This will require moving the kicker plate 114 by its motor 122 through the buttons on the pendant, as before described.

This unique feature is directed toward reducing machine set-up time as it avoids the trial and error kicker plate set-up procedure, which for the presses not so equipped requires repeated error trials during a normal per day run. The technique requires the trial and error set-up of the computer control only once. Subsequent batches of same insole parts will have the kicker plate location set-up automatically by using the computer controls which results in considerable reduction in lost press production.

What is claimed is:

1. An insole molding press having an insole receiving cavity and means for feeding insoles into said cavity for press molding comprising:
    (a) insole feeder support frame adjacent the molding press;
    (b) means in said feeder support frame for supporting insoles in readiness for feeding insoles into the molding press said insole support means includes a pair of double tray means for insoles; and means connected to said pair of double tray means for moving said double tray means so that one double tray means at a time is positioned to place insoles in readiness for feeding the molding press;
    (c) means operable for picking insoles from said insole supporting means and for moving the insoles into the insole receiving cavity; and
    (d) control means operably connected to the molding press and rendered operable by said insole picking and moving means to close the insole receiving cavity upon said insole moving and picking means withdrawing from the insole receiving cavity.

2. The insole molding press of claim 1, wherein manually adjustable means is connected to said insole supporting means for changing the position of said insole supporting means to alter the insole feeding readiness position of said pair of double tray means.

3. The insole molding press of claim 1, wherein insole kicker plate and adjustment means for said kicker plate is operably mounted adjacent the open insole receiving cavity of the moding press, said kicker plate being movable as a stop and ejection means for insoles; and power operated means is connected to said kicker adjustment means to position said kicker means in said insole receiving cavity to stop the insole movement into the receiving cavity at a predetermined position selected by said power operated means and for displacing insoles from the insole cavity.

4. In an insole molding press having a cavity for receiving and press molding insoles, means for feeding insoles to the cavity and discharging finished molded insoles, and means for determining if the cavity is empty to receive subsequent insoles, the improvement comprising:
(a) support means for releasibly holding an insole in a ready position to be molded in the molding press;
(b) insole pick and place means adjacent said insole support means;
(c) controllable means connected to said pick and place means for effecting the picking of an insole from said ready support means, separately actuating said pick and place means for placing the picked insole in the normally open insole receiving position of the molding dies, and withdrawing said pick and place means to allow the molding dies to close and then open;
(d) kicker means at the molding press for positioning an insole in said molding cavity and for kicking a finished molded insole from between the open molding dies; and
(e) control means for cycling the controllable means to pick an insole, place an insole in the open molding dies and withdraw a finished molded insole displaced from the open molding dies.

5. In an insole molding press having a cavity for receiving and press molding insoles, and means for feeding insoles to the cavity and for discharging from the cavity a finished molded insole, the improvement comprising:
(a) insole supply supporting means adjacent the molding press;
(b) first power operated means for picking insoles from said supply supporting means and inserting the picked insoles into the molding press cavity;
(c) insole positioning means operably mounted at the molding press cavity;
(d) second power operated means connected to the insole positioning means at the molding press cavity for locating insoles in selected initial positions in the molding press cavity and for discharging insoles upon completion of the molding thereof; and
(e) means for controlling said first and second power operated means in a predetermined sequence for inserting and discharging insoles relative to the molding press cavity.

6. In an insole molding press having an insole receiving cavity and molding dies in the cavity movable between open insole receiving and discharge positions and closed insole molding positions, the improvement comprising:
(a) an insole locating and ejection kicker plate operatively positioned adjacent the molding press insole receiving cavity;
(b) motor operated means connected to said kicker plate for effecting the positioning of said kicker plate for insole locating in the cavity and for ejecting the insole therefrom;
(c) computer control means having a memory for storing insole style, size and mold die information;
(d) teach pendant means operably connected to said computer control means for adapting the position of said kicker plate to a predetermined position suited for a trial and error run for adapting the position of said kicker plate to a change to a different insole from insole information before stored in the memory of said computer control means, thereby progressively operating said kicker plate motor operated means to adjust the kicker plate position in said insole receiving cavity to a desired position for a change to a different insole; and
(e) means operative to feed insoles into said receiving cavity whereby said adjusted kicker plate positions the insoles to substantially reproduce the insole to the change in the stored style and size information.

7. In combination with an insole molding press having a cavity in which insoles are press molded and insole picking mechanism is operable between an insole receiving station and the press molding cavity, apparatus for providing a substantially continuous supply of insoles to the receiving station of the picking mechanism comprising:
(a) a frame movable in a path adjacent the insole receiving station;
(b) first and second two insole part carrying trays supported by said movable frame, each of said first and second trays having insole discharge ends;
(c) insole feeding means for each of said first and second two insole part carrying trays to advance the insoles toward said discharge ends, said feeding means being movable in each of said trays between positions at said tray discharge ends and retracted therefrom to make room in said trays for the insoles; and
(d) control means in the apparatus including means to detect the presence of said insole feeding means at the discharge ends of said trays for effecting the retraction of said feeding means, and means to move said frame between positions in which the discharge ends of said first and second two insole part carrying trays are alternately aligned at the insole receiving stations to effect the substantially continuous supply of insoles.

8. The apparatus recited in claim 7 wherein each of said first and second two insole part carrying trays include insole retainer means in position to position the insoles in said trays for ready release to the insole picking mechanism.

9. The apparatus of claim 8 wherein said insole retaining means includes resilient means for releasably engaging the insoles.

10. The apparatus recited in claim 7 wherein said first and second two insole part carrying trays include means for adjusting the insole discharge ends relative to the receiving station.

11. The apparatus recited in claim 7 wherein each of said two insole part carrying trays includes means to support left and right foot insoles, and means to adjust the spatial relation of the left and right foot insole supports.

12. The apparatus recited in claim 7 wherein each of said two insole part carrying trays includes means to adjust the left and right foot insole supports relative to the receiving station.

* * * * *

UNITED STATES PATENT AND TRADEMARK OFFICE
CERTIFICATE OF CORRECTION

PATENT NO. : 4,815,956

DATED : March 28, 1989

INVENTOR(S) : Charles Wolfersberger and Joseph R. Hanson, Jr.

It is certified that error appears in the above-identified patent and that said Letters Patent is hereby corrected as shown below:

Column 1, line 12, "has" should be "have".

Column 1, line 44, "encouraged" should be "encountered".

Column 2, line 45, "a" should be inserted after "is".

Column 5, line 18, "heels" should be "heel".

Column 6, line 15, "vacumm" should be "vacuum".

Column 7, line 50, "settigns" should be "settings".

Column 7, line 53, "reponse" should be "response".

Column 8, line 21, "steppig" should be "stepping".

Signed and Sealed this

Sixteenth Day of January, 1990

*Attest:*

JEFFREY M. SAMUELS

*Attesting Officer*   *Acting Commissioner of Patents and Trademarks*